May 19, 1931. T. L. TITUS 1,805,790
LIQUID DISPENSING VALVE
Original Filed June 20, 1928
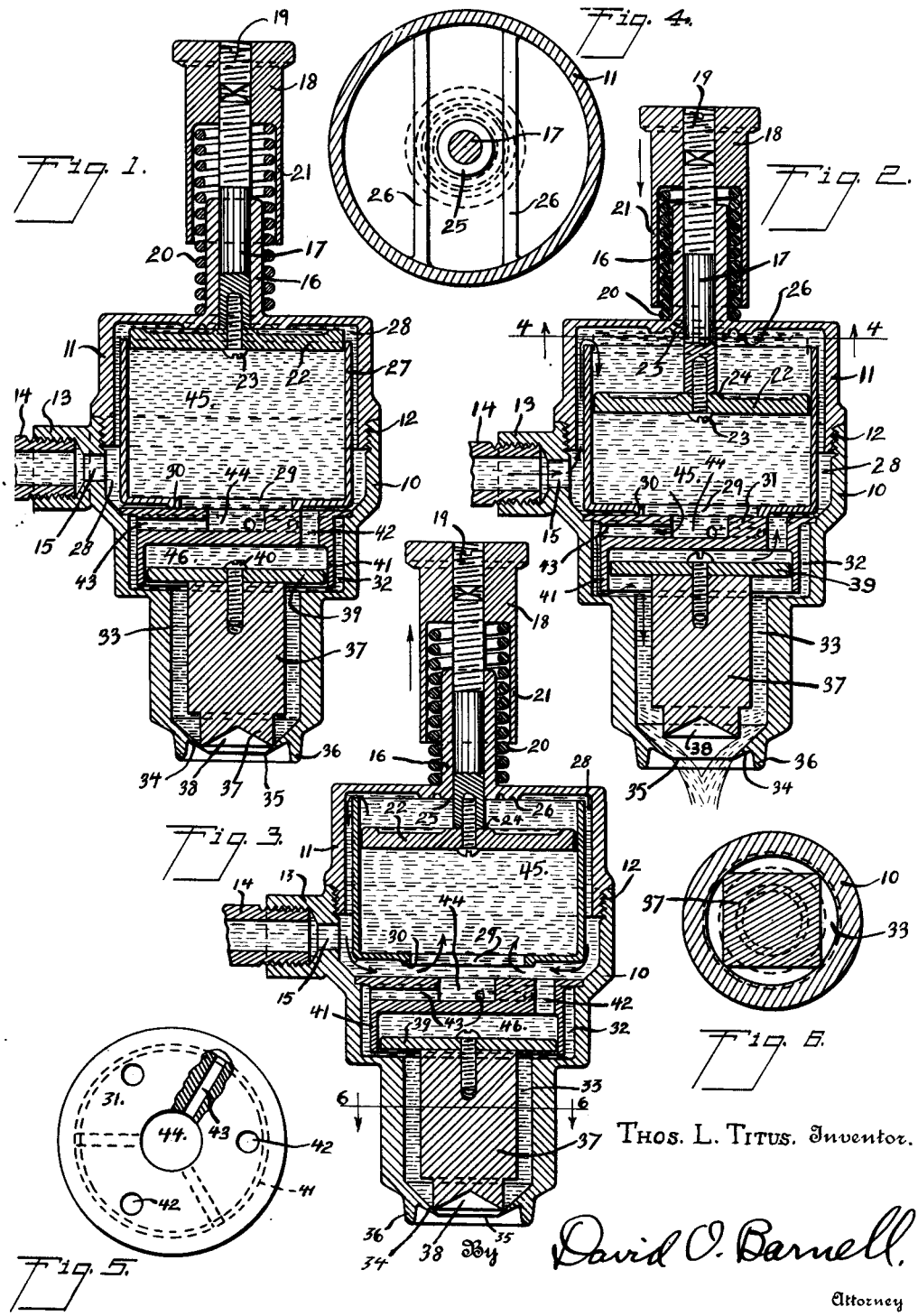
Thos. L. Titus. Inventor.
By David O. Barnell.
Attorney Patented May 19, 1931

1,805,790

UNITED STATES PATENT OFFICE

THOMAS L. TITUS, OF OMAHA, NEBRASKA, ASSIGNOR OF ONE-FOURTH TO MYRTIS BLACKBURN, OF OMAHA, NEBRASKA, AND ONE-FOURTH TO FRANCIS K. HART, OF COUNCIL BLUFFS, IOWA

LIQUID DISPENSING VALVE

Application filed June 20, 1928, Serial No. 286,870. Renewed March 17, 1930.

My invention relates to dispensing valves, or devices for delivering measured quantities of liquid from a container. It is the object of my invention to provide a simple and efficient device which may be operated manually to deliver from the container with which it is connected any desired volume of liquid not exceeding a predetermined amount, the desired quantity of liquid being ejected at each operation, and the measuring chamber being automatically re-filled after each ejecting operation, so that the operation may be repeated immediately if desired. Further objects of my invention are to provide a measuring and ejecting device of this character having means by which after-flow or dripping of the liquid is prevented, after completion of the ejecting or delivering operation; to provide means by which liquid emerging from the delivery opening is prevented from spraying or dividing and is caused to form a coherent mass or solid stream; and to provide means by which the area of the discharge orifice is controlled automatically to effect the ejection of the liquid at a minimum velocity and to thereby avoid splashing or spattering in the receiving vessel to which the liquid is delivered. A further object is to provide a device of this character capable of exerting suction upon the liquid in the container, whereby to elevate the liquid to the valve from a lower gravitational level. A further object of my invention is to provide a dispensing valve for use with cream, or other relatively thick and viscid liquids which require to be positively ejected instead of being merely permitted to flow by gravity, the valve being thereby especially adapted for dispensing beverages and beverage ingredients, such as cream for coffee, or flavored syrups for making carbonated beverages. Further objects of my invention are to provide in a valve of this character means effective to seal and prevent leakage thereto or therefrom during periods intermediate the operation; and to provide a structure with which the parts may be readily separated and detached for conveniently cleansing and sterilizing the same, and in which the parts cannot be incorrectly re-assembled after separation and cleansing thereof.

In the accompanying drawings Fig. 1 is a vertical axial section of a device embodying my invention, the parts being in the normal position thereof, Fig. 2 is a similar view showing the parts in an intermediate position during the ejecting operation, Fig. 3 is a similar view showing characteristic positions of the parts during the return stroke or re-filling of the measuring chamber, Fig. 4 is a detail transverse section on the line 4—4 of Fig. 2, Fig. 5 is a detail plan view of the discharge-valve cylinder-head, and Fig. 6 is a detail horizontal section on the line 6—6 of Fig. 3.

In carrying out my invention according to the illustrated embodiment thereof, I provide a casing comprising a main lower or body portion 10, and an upper or cover portion 11 which is detachably connected with the body 10 at the shouldered and screw-threaded joint 12. The horizontal sectional form of the casing is in general circular or cylindrical, except that at one side of the body there is a laterally projecting tubular boss or nipple 13 which is threaded for connection with the pipe 14 extending to the container, tank, or other source of the liquid to be dispensed by the device. The liquid source may have a level either above or below the nipple, so that the liquid pressure at the intake opening 15 of the casing may be either above or below atmospheric pressure, as the case may be.

On the upper end of the casing-member 11 is a tubular guide 16 in which is disposed slidably the piston-rod 17, the upper portion of said rod being threaded and screwed into the knob or cap 18. A headless set-screw 19 is screwed into the upper end of the threaded opening through said knob, the end of said screw being forced into engagement with the end of the rod 17 to retain the latter in adjusted relations to the knob. A coil spring 20 is disposed around the guide 16 and engages the knob 18 to normally push the same and the rod 17 upwardly, said spring being partially inclosed by a tubular sleeve or skirt 21 formed integrally with the knob. To the lower end of the rod 17, within the casing, the piston 22 is secured by means of a screw 23, and at the normal raised position of the piston, shown in Fig. 1, a flat boss 24 on the upper side of the piston at the center thereof is seated against a similar boss 25 formed on the inside of the cover, said bosses fitting together to form a seal for preventing leakage of liquid or air through the joint between the rod 17 and guide 16. Parallel ribs 26 extend across the inner end-surface of the cover, to form a stop of small contact area, for limiting upward movement of the pump-cylinder 27, which fits slidably about the piston in the suction-chamber 28 formed within the cover 11 and the upper part of the casing-body 10. Said cylinder 27 is a thin-walled cup-shaped member, having a diameter less than that of the chamber 28, the cylinder being guided by the piston to maintain a spaced relation to the walls of said chamber, and being movable vertically therein. In the bottom of the pump-cylinder 27 is a circular central opening 29, and about said opening there is a short downwardly extended lip 30 of which the end surface is normally seated on the upper side of the plate 31. The edge portions of said plate 31 rest upon an annular shoulder formed on the casing-body 10, and the plate constitutes a partition or septum separating the suction-chamber 28 from the discharge-chamber. The discharge-chamber consists of an upper cylindrical portion 32, and a lower guide-portion 33 of smaller diameter than said upper portion, the casing-body 10 being shouldered inwardly at the juncture of said upper and lower portions of the discharge-chamber, and the bottom of the guide-portion 33 being formed by a downwardly inclined annular lip 34 which terminates in a thin edge at the delivery-opening 35. An annular guard-flange 36 is formed integrally with the lip 34, said flange being spaced outwardly from the delivery-opening, and extending to a level below said opening, as shown, whereby to protect the thin edge of the lip 34 from injury or deformation by accidental striking thereof with cups or other receptacles when placing the same beneath the delivery-opening to receive liquid therefrom. The discharge-valve 37 is disposed in the guide-portion 33 of the discharge-chamber, said valve being formed with a weighted upper body-portion which is substantially square in transverse section, but with the corners slightly rounded to fit slidably against the wall of the chamber-portion 33, as shown in Fig. 6. The lower end of the valve 37 is normally seated upon the inclined lip 34 closely adjacent to the delivery-opening, and a conical recess 38 is formed in the exposed end-surface of the valve, whereby said surface is upwardly inclined from the delivery orifice formed at the valve-seat when the valve is in open position. To the upper end of the valve-body 37 the piston 39 is secured by means of a screw 40, and the head of said screw provides a stop of small contact-area for limiting upward movement of the piston in the cylinder 41, in which the piston fits loosely. Said cylinder 41 is formed integrally with the plate or septum 31 and extends therefrom into the chamber 32, the cylinder being spaced from the wall of said chamber and from the shoulder of the casing at the bottom thereof. The central portion of the plate 31 constitutes a head for the cylinder 41, and in the outer portion of said head there are provided a plurality of ports 42 which are interspaced circumferentially with radial ports 43, the inner ends of the latter ports communicating with a central recess 44 formed in the upper side of the head and communicating with the pump-cylinder space through the opening 29 in the bottom of said cylinder. The outer ends of the radial ports 43 communicate with the discharge-chamber 32, outside the cylinder 41, and said ports thus connect the discharge-chamber with the measuring-chamber 45 formed within the pump-cylinder 27 below the piston 22. The ports 42, being spaced outwardly of the seat for the lip 30 on the bottom of the pump-cylinder, afford a constant connection between the suction-chamber 28 and the chamber 46 above the valve-piston 39 in the cylinder 41.

The parts being in the normal position shown in Fig. 1, and the several chambers and ports being filled with liquid, discharge of a portion of the liquid is effected by pushing upon the knob 18, to thereby move the pump-piston 22 downwardly as shown in Fig. 2. By said downward movement of the pump-piston, liquid is expelled from the measuring-chamber 45 through the opening 29 in the bottom of the cylinder 27, passing into the recess 44 and through the radial ports 43 into the discharge-chamber 32—33. The downward movement of the piston 22 causes also a suction in the portion of the pump-cylinder above the piston, by which liquid is drawn into said upper part of the cylinder from the chamber 28, and an equivalent volume of liquid is drawn into the chamber 28 through the intake opening 15 from the liquid-source with which the pipe 14 is connected. The suction caused in the chamber 28 is communicated through the ports 42 to the chamber 46 above the valve-piston 39, and at the same time the pressure of the liquid in the discharge-chamber is exerted upwardly on said piston 39, whereby the piston is actuated to lift the discharge-valve from its seat and allow the ejection of the liquid at the delivery-opening 35. At the conclusion of the downward stroke of the pump-piston, the suction above the piston 39, and the pressure below the same, cease to be exerted, due to the escape of liquid from the discharge-chamber at the delivery opening, and to the supplying of liquid to the chamber 28 through the intake opening 15; and in consequence thereof the discharge-valve immediately descends to its seat and closes the discharge orifice. In this connection it is noted that the fit of the piston 39 in the cylinder 41 should be so proportioned to the viscosity of the liquid to be dispensed, that the valve may move freely to closing position whenever the pressures at opposite sides of the piston 39 are substantially equalized. Preferably, the discharge-valve is biased to closing position merely by the weight of the valve-body and of the piston 39, but it will be obvious that other biasing means, such as a spring, may be employed for this purpose; and in the event that the dispensing device is connected with a liquid-source having a level below the intake-opening 15, whereby the pressure in the suction-chamber 28 is constantly less than atmospheric, then the weight, or other biasing means tending to hold the discharge-valve in closed position, should be sufficient to overbalance the suction at the upper side of the valve-piston in the chamber 46, and at the same time to overcome the frictional resistance to movement of the piston in the cylinder 41. Free movement of the valve-piston in its cylinder is assured by making the fit thereof quite loose, and a slight by-passing or return of liquid from the discharge-chamber, by leakage past the piston into the chamber 46, is permissible, and will facilitate the prompt closing of the valve at the end of the downward stroke of the pump-piston.

The volume of liquid expelled during the downward stroke of the pump-piston is proportional to the length of the stroke, which is limited by the engagement of the skirt 21 with the top of the cover 11, or by the spring 20 being so compressed that its coils are in contact with each other; and the length of stroke so permitted may be varied by adjusting the position of the knob 18 on the threaded portion of the piston-rod 17, the adjustment being retained by tightening down the setscrew 19, as before mentioned.

When the downward pressure upon the knob 18 is removed, the spring 20 raises the same, together with the pump-piston and the rod 17, to the normal position at which the bosses 24 and 25 are seated together to seal the joint between the piston-rod and its guide 16. During the upward stroke of the piston the pump-cylinder 27 is lifted as shown in Fig. 3, so that the lip 30 on the bottom of the cylinder is unseated from the septum 31, the upward movement of the cylinder being limited by engagement of its upper edge with the ribs 26 on the cover 11, and the liquid in the pump-cylinder is transferred from above to below the piston 22, said liquid passing over the upper end of the cylinder-wall, thence downwardly through the chamber 28 around the outside of the cylinder, thence inwardly beneath the bottom of the cylinder and through the opening 29 to the chamber 45 beneath the piston. The raising of the cylinder is effected principally by the difference of the pressures on the bottom of the cylinder, the pressure being momentarily less at the inside than at the outside thereof; but the fricitonal contact between the piston and cylinder also tends to lift the latter as the piston makes its upward stroke. The fit of the piston in the cylinder 27 is preferably so proportioned to the viscosity of the liquid that, after completion of the upward stroke, the weight of the cylinder will be sufficient to cause its descent to the position at which the lip 30 is seated upon the septum 31; but if the descent of the cylinder should not so occur, by reason of friction between the piston and cylinder, or if the piston be again forced downwardly before the descent of the cylinder is completed, the downward movement of the piston will first actuate the cylinder until the same is seated upon the septum, and then during the remainder of the piston-movement the operation will be as previously described. It will be seen that the pump-cylinder itself is caused to function as a valve for controlling the intake of liquid to the chamber 45, and its discharge therefrom.

It will be noted that, as the opening movement of the discharge-valve is caused by pressure of the liquid in the discharge-chamber 32—33, the extent to which the valve is opened will be automatically proportioned to the rate at which the liquid is delivered to the discharge-chamber from the measuring-chamber in the pump-cylinder, and consequently the velocity of the liquid emerging at the delivery orifice will be substantially constant, regardless of the rate at which the discharge stroke of the pump-piston is effected. It will be obvious, for example, that if the liquid be forced into the discharge-chamber at a rate exceeding that at which it is escaping through the delivery orifice, pressure in the discharge-chamber will tend to be increased, but any increase of pressure in said chamber will effect a further opening movement of the valve, thereby increasing the area of the discharge orifice and enabling a greater volume of liquid to pass through said orifice without appreciable increase of velocity. The discharge-valve structure thus enables the liquid to be ejected from the delivery orifice at a velocity so low as to avoid splashing or spattering thereof in the cup or other vessel in which the liquid is received from the dispensing device.

Referring particularly to Fig. 2, it will be noted that the liquid is delivered from the device through an annular convergent orifice, formed between the lower edge of the valve 37 and the inner surface of the conically inclined lip 34 of the casing-body. All portions of the emerging stream are thus directed toward a common center, thereby tending to form a coherent cylindrical body or mass, and avoiding any tendency to cause spraying or spattering of the liquid. Wetting of the lower end-surface of the valve-body 37 is avoided by the formation of the conical recess 38 therein, and the inwardly convergent direction of the emerging stream likewise avoids wetting of the outer surface of the lip 34. When the discharge-valve is seated, at the conclusion of the ejecting operation, the liquid stream is stopped abruptly, the annular sheet of liquid about the air-space in the recess 38 being cut off substantially at the edge of the lip 34, and at the final instant of closure the liquid sheet being reduced to the thinness of a bubble, so that upon the cessation of flow the exposed wetted surface about the discharge orifice has not enough liquid in contact therewith to form an adherent drop or drops, and dripping or after-flow of the liquid is thus effectively prevented.

For cleansing and sterilizing the device, the parts may be readily separated by unscrewing the cover portion 11 of the casing from the body-portion 10, then lifting from the latter the cylinder 27, the septum 31 and cylinder 41, and the piston 39 and valve-body 37. The pump-piston 22 may be disconnected from the piston-rod 17 by removing the screw 23, and the piston-rod and knob 18 may then be removed from the cover without changing the adjusted relation of said rod and knob. After cleansing and sterilizing the parts, the re-assembly thereof is readily effected by merely replacing the loose pieces within the casing, and screwing together the cover and body thereof, the inclosed parts being so formed and proportioned that misplacing or incorrect assembly thereof is impossible.

Now, having described my invention, what I claim and desire to secure by Letters Patent is:

1. In a structure of the class described, a piston, a cylinder fitting slidably upon said piston and having end-openings for admitting fluid to opposite sides of the piston, means for actuating the piston longitudinally of the cylinder, the cylinder being movable longitudinally, fixed means forming stops for limiting the longitudinal movement of the cylinder in each direction, said fixed means at one end of the cylinder having a perforate seat engageable by said end of the cylinder and through which contents of the cylinder may be forced by movement of the piston toward the same while said end of the cylinder is engaged with said seat, and means for preventing return flow through said perforate seat to the cylinder during movement of the piston away from said seat, so that as said end of the cylinder is disengaged from the seat the cylinder-space may be refilled from a body of fluid surrounding the cylinder.

2. In a liquid dispensing device, a casing having a transverse septum dividing the space therein to form a suction-chamber and a discharge-chamber, means connecting the suction-chamber with a liquid-source, a pump-cylinder disposed loosely in the suction-chamber and having a perforate end-portion normally seated upon said septum, a pump-piston movable in the pump-cylinder and adapted to move said cylinder from and into seating position upon the septum, a valve-cylinder carried upon the septum and extending into the discharge-chamber, a valve-piston movable in said cylinder and subject at one side to pressure from the discharge-chamber and at the other side to pressure from the suction-chamber, there being a passage through the pump-cylinder-seat communicating with the discharge-chamber, and a valve carried by said valve-piston and controlling a delivery-opening from the discharge-chamber.

3. In a structure of the class described, a casing inclosing a suction-chamber and connected with means for supplying liquid to said chamber, a movable pump-cylinder immersed within the liquid in said chamber, a piston guided by the casing and fitting within said cylinder to guide the same, said piston being movable relatively to the cylinder to displace liquid alternately from the end-portions of the cylinder, a seat formed at one end of said suction-chamber about a discharge-passage extending therefrom, the adjacent end of the pump-cylinder being adapted to engage said seat during displacement of liquid therefrom by movement of the piston toward said end of the cylinder, a valve for preventing return-flow of liquid through said discharge-passage, and a stop on the casing for limiting movement of the pump-cylinder away from said seat.

THOMAS L. TITUS.